(12) United States Patent
Arndt

(10) Patent No.: US 11,525,749 B2
(45) Date of Patent: Dec. 13, 2022

(54) TELESCOPIC ANALOG FRONT-END FOR PRESSURE SENSORS

(71) Applicant: Apple Inc., Cupertino, CA (US)

(72) Inventor: Gregory B. Arndt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 620 days.

(21) Appl. No.: 15/986,705

(22) Filed: May 22, 2018

(65) Prior Publication Data

US 2019/0360882 A1 Nov. 28, 2019

(51) Int. Cl.
*G01L 9/00* (2006.01)

(52) U.S. Cl.
CPC .................. *G01L 9/0072* (2013.01)

(58) Field of Classification Search
CPC .................. G01L 9/0072; G01L 9/12
USPC .......................................................... 73/724
See application file for complete search history.

(56) References Cited

U.S. PATENT DOCUMENTS

| 4,517,622 | A | * | 5/1985 | Male | G01L 9/12 |
| | | | | | 361/283.1 |
| 5,992,240 | A | * | 11/1999 | Tsuruoka | G01L 9/125 |
| | | | | | 73/718 |
| 6,509,746 | B1 | * | 1/2003 | Wang | G01D 5/24 |
| | | | | | 324/678 |
| 2002/0178827 | A1 | * | 12/2002 | Wang | G01L 9/12 |
| | | | | | 73/718 |
| 2005/0005703 | A1 | * | 1/2005 | Saito | G01L 9/12 |
| | | | | | 73/780 |
| 2006/0273805 | A1 | * | 12/2006 | Peng | G01R 27/2605 |
| | | | | | 324/686 |
| 2007/0171108 | A1 | * | 7/2007 | Wang | G01L 9/12 |
| | | | | | 341/143 |
| 2011/0115503 | A1 | * | 5/2011 | Chou | H03K 17/962 |
| | | | | | 324/679 |
| 2012/0328129 | A1 | * | 12/2012 | Schuurmans | H03M 3/48 |
| | | | | | 381/122 |
| 2014/0260690 | A1 | * | 9/2014 | Corder | G01L 9/0072 |
| | | | | | 73/862.626 |

FOREIGN PATENT DOCUMENTS

| CN | 104853280 A | * | 8/2015 |
| JP | 2009222523 A | * | 10/2009 |
| JP | 4997447 B2 | * | 8/2012 |

* cited by examiner

*Primary Examiner* — Marrit Eyassu
(74) *Attorney, Agent, or Firm* — BakerHostetler

(57) ABSTRACT

A wireless communication device includes a pressure sensor to generate a first signal in response to a pressure variation. A variable offset capacitor is coupled in parallel with the pressure sensor. A first analog-to-digital converter (ADC) is coupled to the variable offset capacitor and to convert the first signal to a digital signal. The pressure sensor is a capacitive pressure sensor. The variable offset capacitor is a digitally controlled variable capacitor and the ADC is a low-resolution and low-power ADC.

19 Claims, 8 Drawing Sheets

(PRIOR ART)

TELESCOPIC ANALOG FRONT-END FOR PRESSURE SENSORS

TECHNICAL FIELD

The present description relates generally to sensor technology, and more particularly, to a telescopic analog front-end for processing pressure sensor signals.

BACKGROUND

Portable communication devices (e.g., smart phones and smart watches) are becoming increasingly equipped with environmental sensors such a pressure, temperature and humidity sensors, gas sensors and particulate matter (PM) sensors. For example, a pressure sensor enables a smart watch or a smart phone to measure pressure as well as other parameters related to pressure, for example, elevation, motion, flow or other parameters. Pressure sensors are used to measure pressure in a gas or liquid environment.

Pressure sensors can vary drastically in technology, design, performance and application. In terms of technologies employed, pressure sensors can be categorized as, for example, piezoelectric, capacitive, electromagnetic, optical or potentioffsetric pressure sensors. The micro-electro-mechanical system (MEMS) type pressure sensors used in smart phones or smart watches are generally capacitive-type pressure sensors, and are employed along with an interface that enables proper measurement of the sensed pressure by a suitable electronic circuit.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

In one or more aspects, the subject technology is directed to a telescopic analog front-end for processing a signal from a pressure sensor. The pressure-sensing device of the subject technology can be implemented in a wireless communication device such as a smart phone or a smart watch. The disclosed pressure-sensing device includes a pressure sensor and a telescopic front-end circuit including a variable offset capacitor and a first analog-to-digital converter (ADC). The pressure sensor can generate a first signal in response to a pressure variation for example due to altitude change. The variable offset capacitor is coupled in parallel with the pressure sensor. The first ADC is coupled to the offset capacitor and can convert the first signal to a digital signal.

The first ADC can be a low-resolution and low-power ADC. In one or more implementations, a resolution of the first ADC is within a range of about 13-15 bits, and a power consumption of the first ADC is within a range of about 4-9 μWatt. In one or more implementations, the pressure sensor is a miniature (e.g., having dimensions of the order of a few millimeters) capacitive pressure sensor. The variable offset capacitor can be a digitally controlled variable capacitor. In one or more implementations, the digitally controlled variable capacitor is a digital-to-analog converter (DAC) circuit. In some implementations, the telescopic front-end circuit includes a gain stage and a second ADC. The gain stage can be coupled between the DAC circuit and the first ADC, and the second ADC can be coupled to a digital input of the DAC circuit. In some implementations, the second ADC is a low-speed (e.g., within a range of about 0.5-0.7 Hz) and low-resolution (within a range of about 6-8 bits) ADC. A digital input of the second ADC is coupled to an adder circuit that is coupled between an output of the pressure sensor and an input of the first ADC.

Figure 1A:
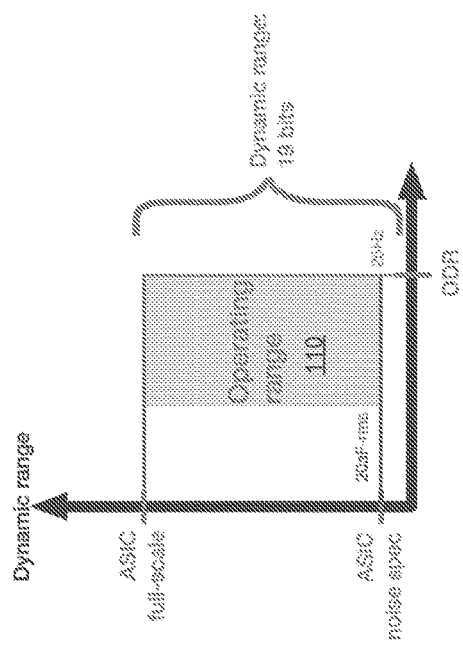
FIGS. 1A through 1C are a table and charts illustrating example characteristics of a capacitive pressure sensor.
Figure 1B:
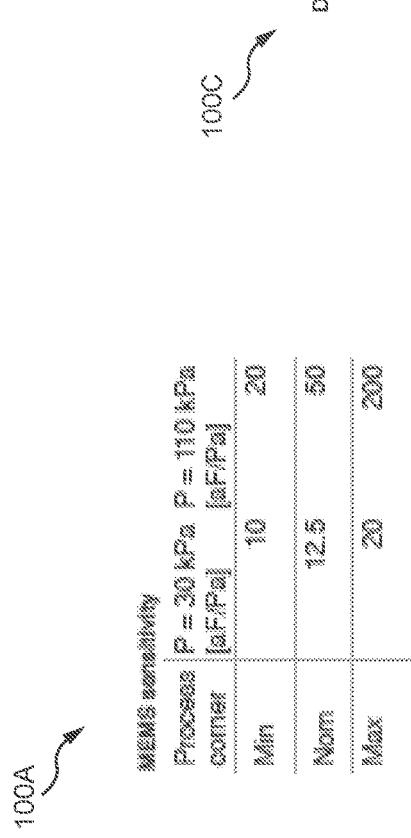
Figure 1C:
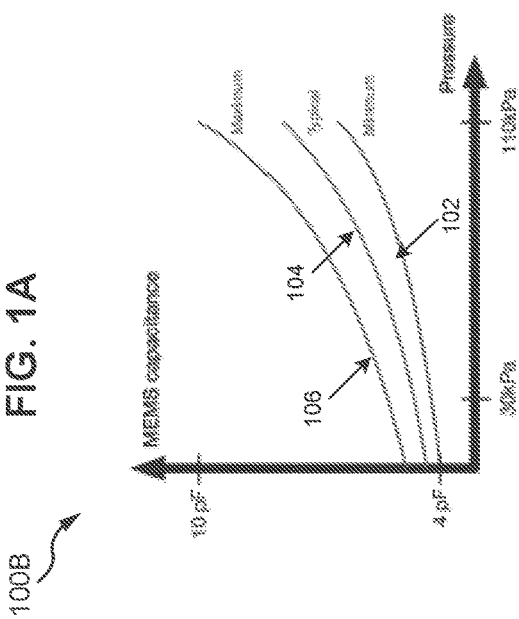

FIGS. 1A through 1C are a table 100A and charts 100B and 100C illustrating example characteristics of a capacitive pressure sensor. In the table 100A of FIG. 1A, a typical micro electro-mechanical system (MEMS) sensitivity values for various process corners (e.g., minimum, normal and maximum) are shown. The sensitivity values are expressed in terms of capacitance in atto ($10^{-18}$) Farad per pressure unit, Pascal (Pa). The sensitivity values are given for a low-pressure of 30 kPa associated with high elevations (e.g., at Mount Everest) and a high-pressure scenario of 110 kPa (e.g., at sea level). The chart 100B of FIG. 1B shows variation of a typical MEMS capacitance versus pressure. Plots 102, 104 and 106 are associated with the minimum, typical and maximum process corners, respectively. The chart 100C shows dynamic range of an application-specific integrated circuit (ASIC), such as a front-end processor for a capacitive pressure sensor, as a function of output data rate (ODR). For the operating range 110 that ends in 25 ODR, the dynamic range is given as 19 bits. The dynamic range in dB can be calculated from the following expression:

$$DR = 20 \log [C_{max}/(S_{min} * n_{rms})] \qquad (1)$$

Where $C_{max}$ and $S_{min}$ represent the full-scale capacitance (e.g., 10 pF) and the minimum sensitivity (e.g., 10 aF/Pa) of the capacitive MEMS and $n_{rms}$ is a root-mean square (rms) value of noise level (e.g., 2 Pa-rms).

Figure 2:
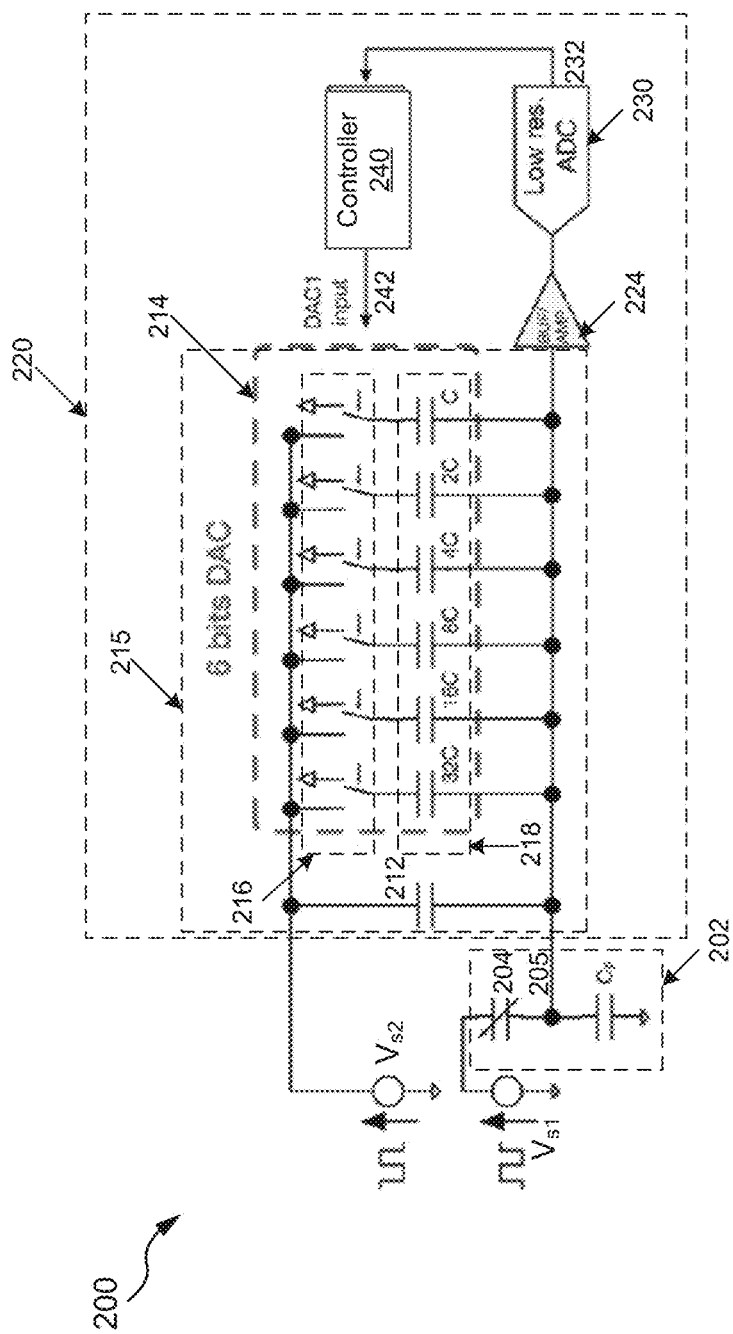
FIG. 2 is a schematic diagram illustrating an example of a pressure-sensing device, in accordance with one or more aspects of the subject technology.

FIG. 2 is a schematic diagram illustrating an example of a pressure-sensing device 200, in accordance with one or more aspects of the subject technology. The pressure-sensing device 200 includes a MEMS pressure sensor 202 and a telescopic front-end circuit 220. The telescopic front-end circuit 220 includes, a variable offset capacitance 215, a gain stage 224 (e.g., an amplifier or a buffer), an analog-to-digital converter (ADC) 230 and a controller 240. The MEMS pressure sensor 202 is represented with a MEMS capacitor 204 coupled through a parasitic capacitance $C_p$ to a ground potential. The MEMS capacitor 204 is biased via a bias supply voltage ($V_{s1}$). As shown in FIG. 1C and the expression (1) the dynamic range of the ADC is dependent on a value of the full-scale capacitance of the MEMS capacitor 204. For example, if a value of 10 pF is used for the $C_{max}$ and values of 10 aF/Pa and 2 Pa are used, respectively, for $S_{min}$ and $n_{rms}$, a value of 114 dB is found for the dynamic range of the ADC, which corresponds to 19 bits. Such a high-resolution for ADC can result in a high-power consumption of about 130 μW, as can be calculated using the known expression:

$$\text{Power} = \text{ADC\_FOM2} * \text{ODR} * 2^{nb} \quad (2)$$

Where ADC_FOM2 is the ADC figure of merit taken to be 10 pJ per conversion step from the scientific literature, and nb is the dynamic range specified in terms of number of bits. The calculated power consumption of about 130 μW is based on an ODR of 25 Hz and a dynamic range (nb) of 19 bits. The high power consumption of the ADC can be a blocker in achieving a sub-100 μW MEMS pressure sensing device. The subject technology drastically reduces the power level to sub-10 μW by using the variable offset capacitance 215 and a low resolution (e.g., 12-15 bits) ADC, as described herein.

The existing solutions use an offset capacitance of, for example, 4 pF in parallel with the MEMS capacitor 204 to reduce the range of variation of the capacitance of the MEMS capacitor 204 to 6 pF (see FIG. 1B), which does not significantly affect the ADC resolution and power consumption. In the example telescopic front-end circuit 220, the variable offset capacitance 215 can be formed by using a fixed offset capacitor 212 in parallel with a capacitive digital-to-analog convertor (DAC) 214. The capacitive DAC 214 can be, for example, a 6-bits DAC, but is not limited to that. In some implementations, the capacitive DAC 214 includes a set of switches 216 and a set of capacitors 218 that can change the capacitance of the DAC based on a digital control signal 242 from the controller 240. The set of switches 216 are controlled by the digital control signal 242 and can add or drop any of capacitors (e.g., C, 2C, 4C, 8C, 16C and 32C) of the set of capacitors 218 to dynamically change a variation range associated with values of the capacitance of the pressure-sensing device. The variable offset capacitance 215 is coupled to a bias-voltage source $V_{S2}$, which can be equal or the same as the bias-voltage source $V_{S1}$.

The gain stage 224 may be implemented as an amplifier or a buffer circuit. In one or more implementations, the gain stage 224 may have a gain of about $2^6=64$. The ADC 230 can be low-resolution and low-power ADC, as discussed below. The controller 240 can employ an algorithm to convert an output digital signal 232 of the ADC 230 to the digital control signal 242. In some implementations, the controller 240 can be a microcontroller, or a processor (e.g., general processor or a dedicated processor) of a host device such as a communication device (e.g., a smart phone or a smart watch) that uses the pressure-sensing device of the subject technology.

Figure 3:
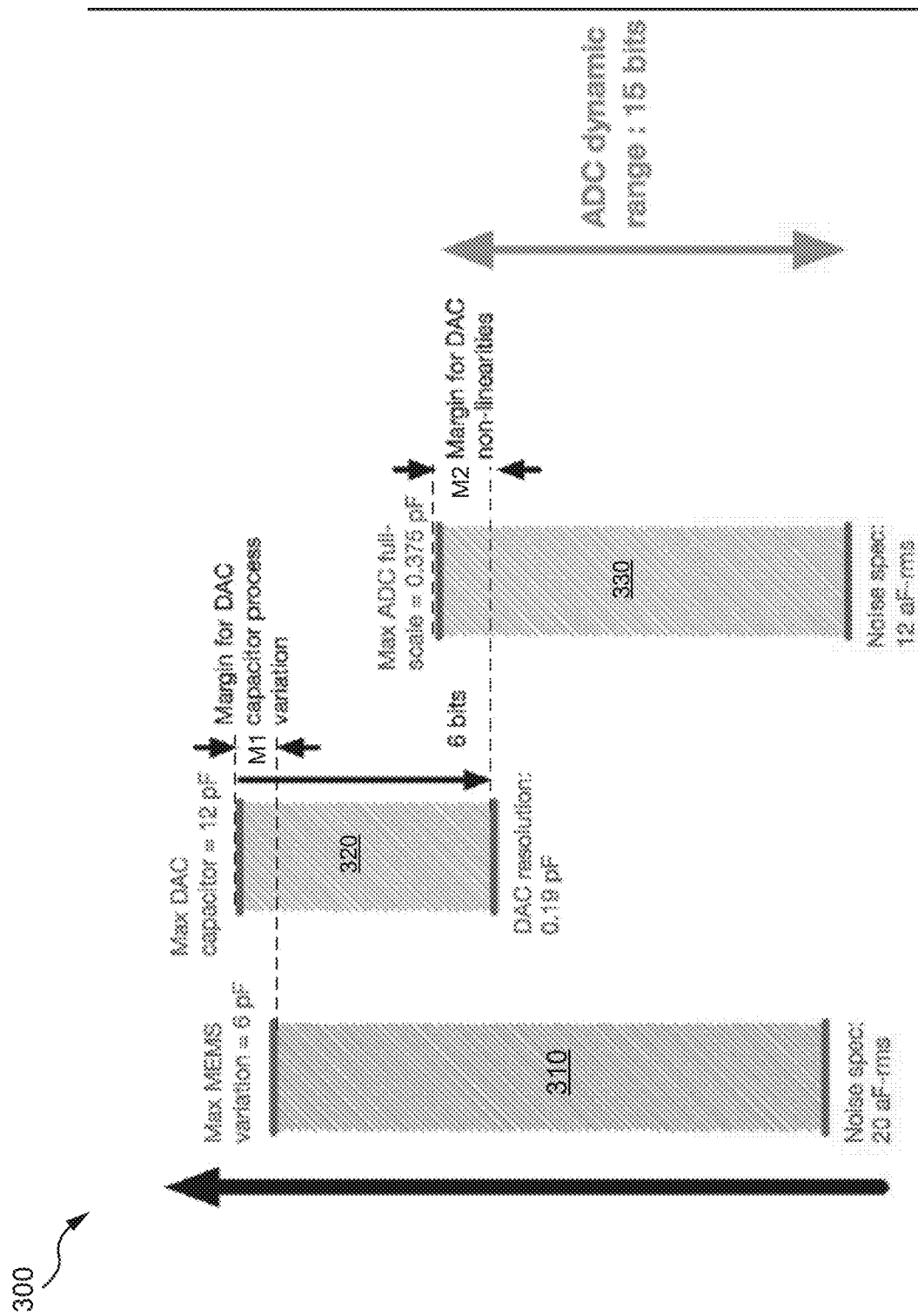
FIG. 3 is a chart illustrating an example dynamic-range representation associated with the pressure-sensing device of FIG. 2, in accordance with one or more aspects of the subject technology.

FIG. 3 is a chart illustrating an example dynamic-range representation 300 associated with the pressure-sensing device 200 of FIG. 2, in accordance with one or more aspects of the subject technology. The dynamic-range representation 300 shown in FIG. 3 includes sections 310, 320 and 330. The section 310 is associated with a conventional system, which uses a fixed 4 pF offset capacitor to reduce the maximum variation range of the MEMS capacitor 204 of FIGS. 2 to 6 pf, and a noise spectrum rms value of 20 aF. The subject technology further reduces the maximum variation range of the MEMS capacitor 204 by adding the capacitive DAC 214 (e.g., a 6-bit DAC) of FIG. 2 to reduce the maximum variation range of the MEMS capacitor 204 by 6-bits, as depicted by section 320. It is noted that section 320 includes a margin (M1) for DAC capacitor process variation, which is reduced from the Maximum DAC capacitance of about 12 pF.

The example resultant dynamic range of the ADC 230 of FIG. 2 is shown in section 330, which takes into account a max ADC full-scale capacitance of 0.375 pF, which is higher, by a margin of M2 from the DAC resolution of 0.19 pF of section 320. The example resultant dynamic range of the ADC 230 is shown to be lower than 15 bits, for example 14 bits, which from the expression (2) translates into a power level of about 4.1 μW for the ADC 230. Even assuming a one bit as the margin M2 to overcome nonlinearities of the ADC 230, the resultant power level will only increase to about 8.2 μW that is significantly lower than the value of 130 μW, calculated above for an ADC of the conventional solution.

Figure 4:
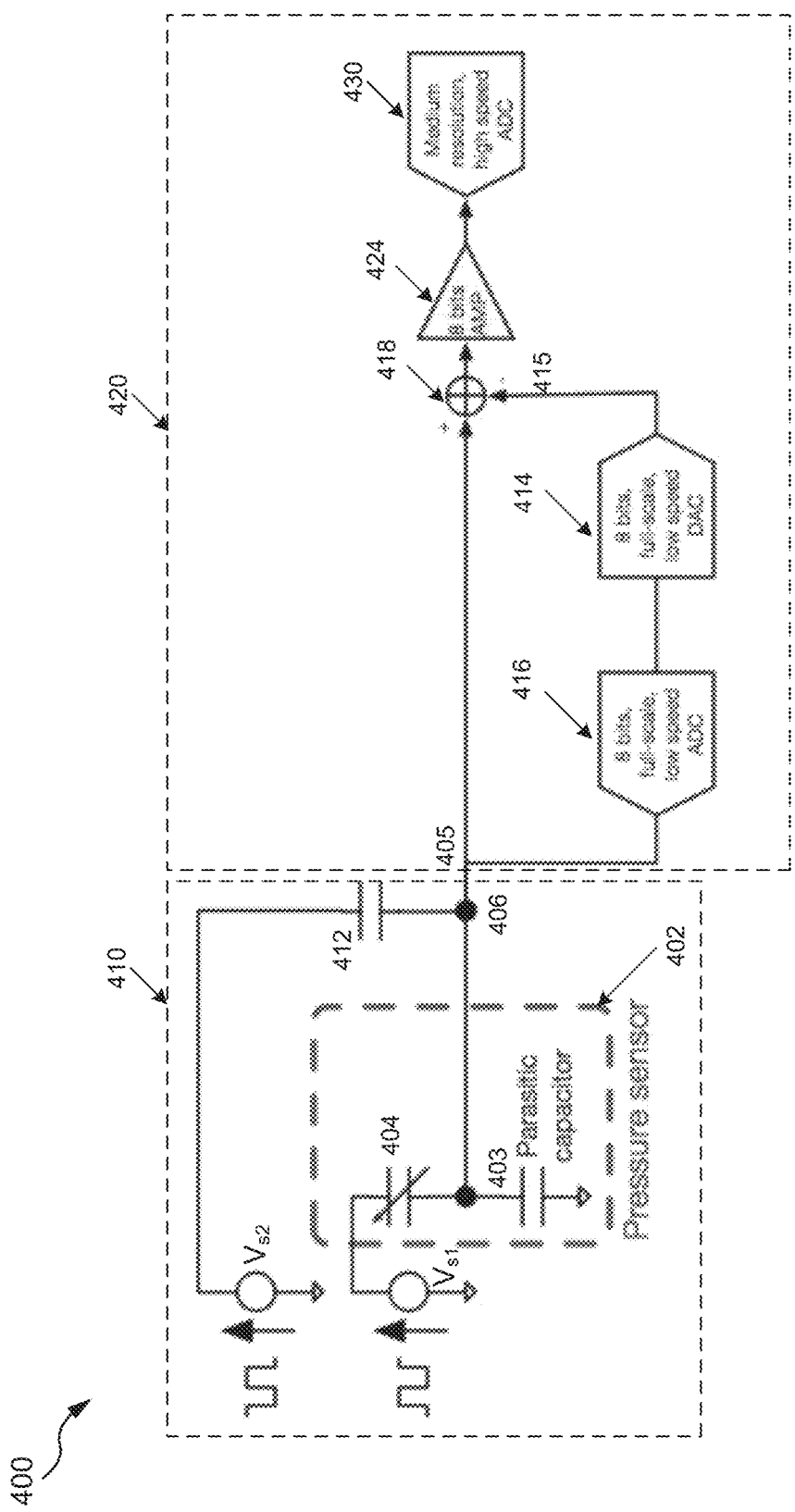
FIG. 4 is a schematic diagram illustrating an example of a pressure-sensing device, in accordance with one or more aspects of the subject technology.

FIG. 4 is a schematic diagram illustrating an example of a pressure-sensing device 400, in accordance with one or more aspects of the subject technology. The pressure-sensing device 400 includes a MEMS pressure-sensing circuit 410 and a telescopic front-end circuit 420, which is another implementation of telescopic front-end circuit 220 of FIG. 2. The MEMS pressure-sensing circuit 410 includes the capacitive MEMS pressure sensor 402 represented by a capacitor 404 and a parasitic capacitor 403 and an offset capacitor 412. The parasitic capacitor 403 is coupled to the ground potential. The capacitor 404 is connected to a bias-voltage source $V_{S1}$. The offset capacitor 412 is connected in parallel to the capacitor 404 between a node 406 and a bias-voltage source $V_{S2}$, which can be the same or equal to the bias-voltage source $V_{S1}$.

In the telescopic front-end circuit 420, a second ADC 416 is connected between the node 406 and an input node of a DAC 414. A summation circuit 418 (e.g., combiner) is employed to combine (e.g., subtract) an analog signal 415 (e.g., voltage) of the DAC 414 from the analog output signal 405 (e.g., voltage) of the MEMS pressure-sensing circuit 410. The output signal of the summation circuit 418 is applied via a buffer stage 424 to a first ADC 430. The first ADC 430 is a medium-resolution (e.g., about 12 bits) and high-speed (e.g., about 25 bits/sec or Hz), whereas the second ADC 416 is a low-resolution (e.g., 8 bits) and low-speed (e.g., 0.6 Hz) ADC. The solution provided by the telescopic front-end circuit 420 uses two separate ADCs (e.g., 416 and 430) to divide the dynamic range into two different regions as discussed below.

Figure 5:
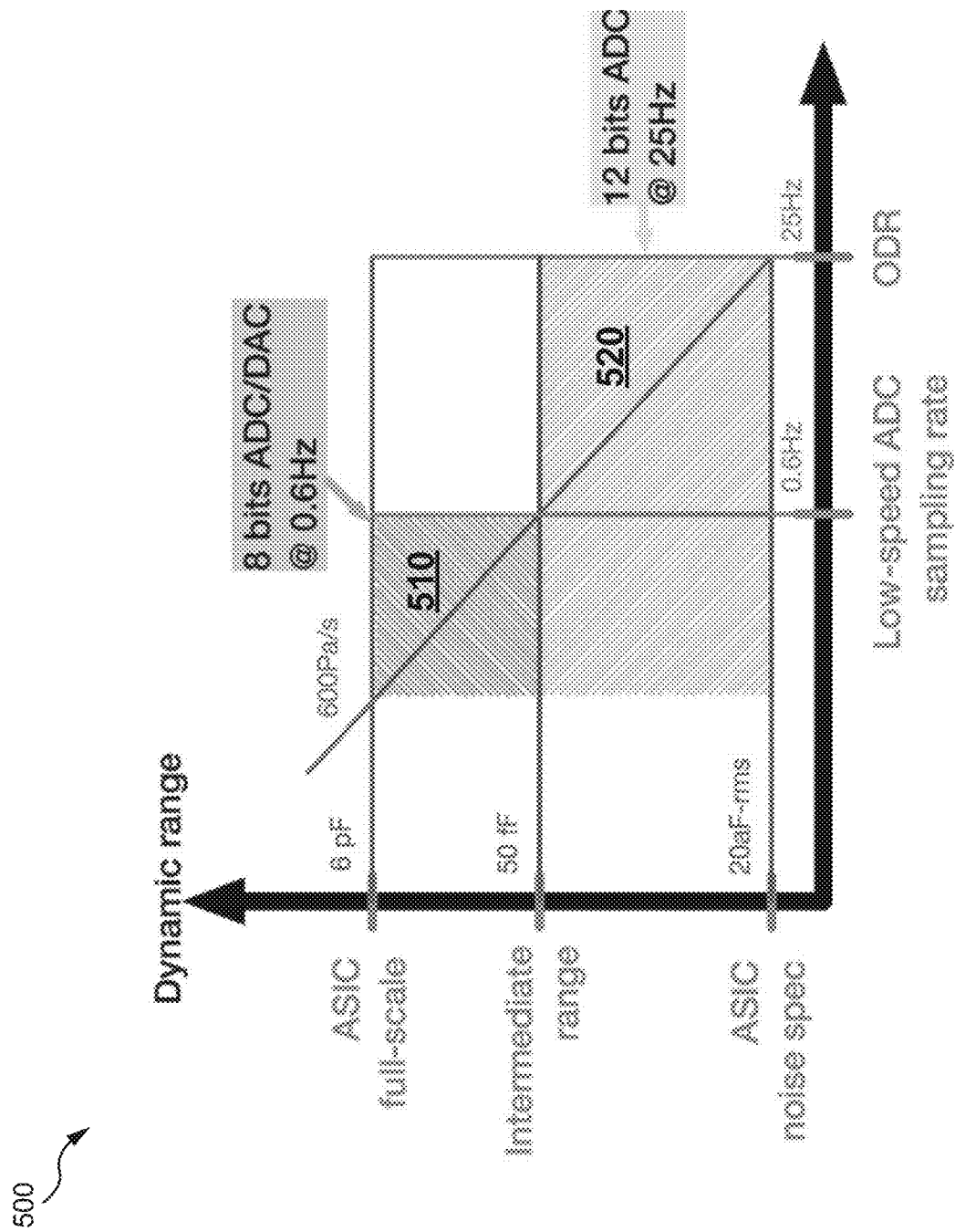
FIG. 5 is a chart illustrating an example dynamic range plot associated with the pressure-sensing device of FIG. 4, in accordance with one or more aspects of the subject technology.

FIG. 5 is a chart illustrating an example dynamic range plot 500 associated with the pressure-sensing device 400 of FIG. 4, in accordance with one or more aspects of the subject technology. The example dynamic range plot 500 is plot of dynamic range versus output data rate (frequency) and shows two regions 510 and 520. The dynamic range is specified in terms of capacitance values. The region 510 is associated with a lower frequency range below about 0.6 Hz and a dynamic range corresponding to capacitance (e.g., ASIC capacitance) values between 6 pF and 50 fF. The region 510 is covered by the low-speed (e.g., <0.6 Hz) and low-resolution (e.g., ~8 bits) ADC 416 of FIG. 4. The region 520 is a higher frequency (e.g., between 0.6 Hz and 25 Hz) and medium resolution (e.g., 12 bits) and is associated with a dynamic range corresponding to capacitance (e.g., ASIC capacitance) values between 50 fF and 20 aF-rms (e.g., corresponding to ASIC nose). The ASIC referred to above is an ASIC that the MEMS pressure-sensing circuit 410 of FIG. 4 is coupled to and may include, for example, the second ADC 416, the DAC 414, the summation circuit 418, the gain stage 424 and the first ADC 430, but may not be limited to these components. In some aspects, the ASIC includes, but is limited to, the capacitive DAC 214, the variable offset capacitance 215, the gain stage 224, the ADC 230 and the controller 240 of FIG. 2.

Figure 6:
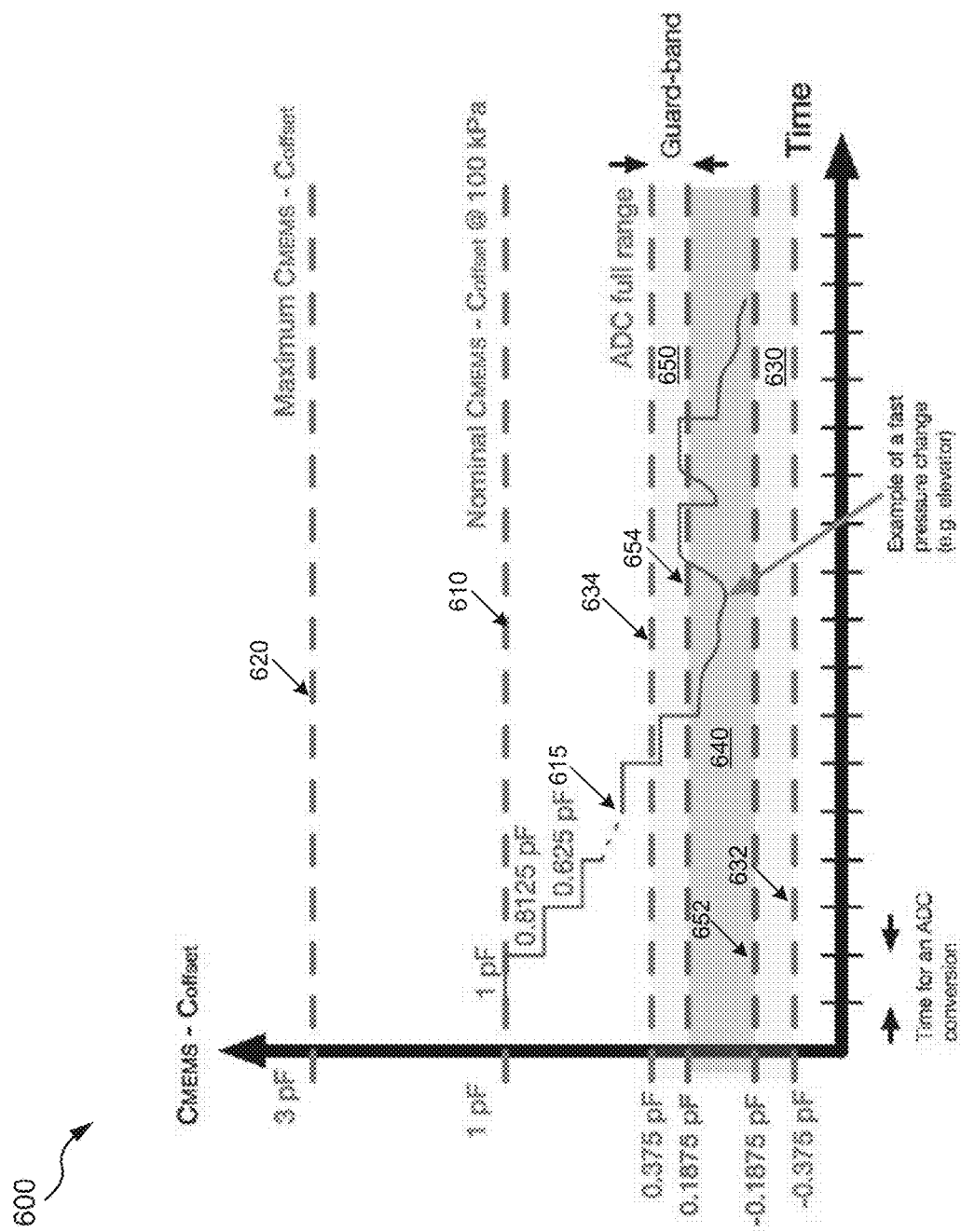
FIG. 6 is a chart illustrating an example dynamic characteristic representation associated with a telescopic front-end circuit, in accordance with one or more aspects of the subject technology.

FIG. 6 is a chart illustrating an example dynamic characteristic representation 600 associated with a telescopic front-end circuit (e.g., 200 of FIG. 2), in accordance with one or more aspects of the subject technology. The example dynamic characteristic representation 600 is a plot of a resultant capacitance versus time. The resultant capacitance is used to represent a respective dynamic range. The resultant capacitance is a result of subtraction of the offset capacitance ($C_{offset}$, e.g., of 215 of FIG. 2) from the MEMS capacitance ($C_{MEMS}$, e.g., of 202 of FIG. 2). Capacitance levels 610 and 620 correspond to a (nominal $C_{MEMS}-C_{offset@100\ KPa}$) and a (maximum $C_{MEMS}-C_{offset}$), and their values are about 1 pF and 3 pF, respectively.

Levels 632 and 634 at capacitance levels of –0.375 pF and 0.375 pF correspond to a full range of the ADC (e.g., ADC 230 of FIG. 4). Guard-bands 630 and 650 around the operating range 640 are created by levels 652 and 654 at –0.1875 pF and 0.1875 pF to overcome non-idealities of the ADC 230 and DAC 214. The plot 615 shows how the controller 240 operates to control the capacitance value of the capacitive DAC 214 to lower the value of $C_{MEMS}$, for example, from a 1 pF value to bring, step-by-step, the value of the resultant capacitance within an operating range 640 of the ADC 230. In some applications, a sudden pressure change may be measured that the ADC has to be able to handle. For example, when a user of a smart watch or smart phone hosting the pressure sensing device and its associated front-end of the subject technology uses an elevator to go up, the pressure may drop at about 600 Pa/sec (corresponding to a speed of about 60.6 m/sec of the fastest elevator). At this pressure drop rate (600 Pa/sec) it takes about 1.7 sec for the pressure to change, for example, about 1 kPa. Assuming an ADC conversion rate of about 20 Hz (20 samples/sec), an ADC conversion for ADC 230 takes about 50 msec. If the ADC conversion output is greater than the values corresponding to guard-bands 630 or 650, the value of the digital input 242 of the DAC 214 will be incremented or decremented, respectively, by one step corresponding to about 0.1875 pF or about 187.5 Pa, based on FIG. 1A. The rate of change of the ADC is about 187.5 Pa in 50 msec that corresponds to 3750 Pa/sec, which is far greater than the pressure change seen in the fastest elevator. In other words, the ADC 214 will remain in its operating range for fast pressure changes.

Figure 7:
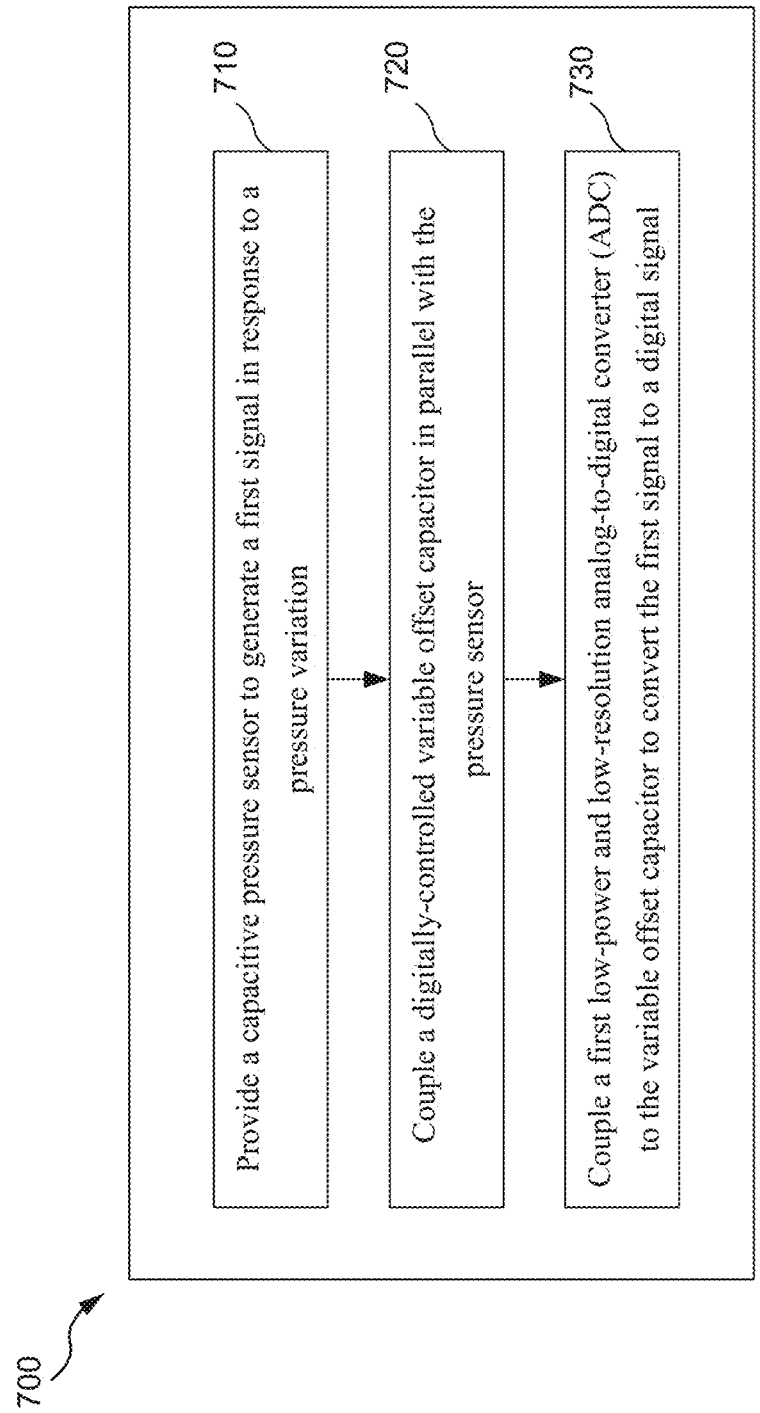
FIG. 7 is a flow diagram illustrating a process for providing a telescopic front-end circuit for processing a pressure sensor signal, in accordance with one or more aspects of the subject technology.

FIG. 7 is a flow diagram illustrating a process 700 for providing a telescopic front-end circuit for processing a pressure sensor signal (e.g., 205 of FIG. 2), in accordance with one or more aspects of the subject technology. The process 700 begins with providing a capacitive pressure sensor (e.g., 202 of FIG. 4) to generate a first signal (e.g., 205 of FIG. 2) in response to a pressure variation (710). The process 700 further includes coupling a digitally-controlled variable offset capacitor (e.g., 215 of FIG. 2) in parallel with the pressure sensor (720). A first low-power and low-resolution analog-to-digital converter (ADC) (e.g., 230 of FIG. 2) can be coupled to the variable offset capacitor to convert the first signal to a digital signal (e.g., 232 of FIG. 2) (730).

Figure 8:
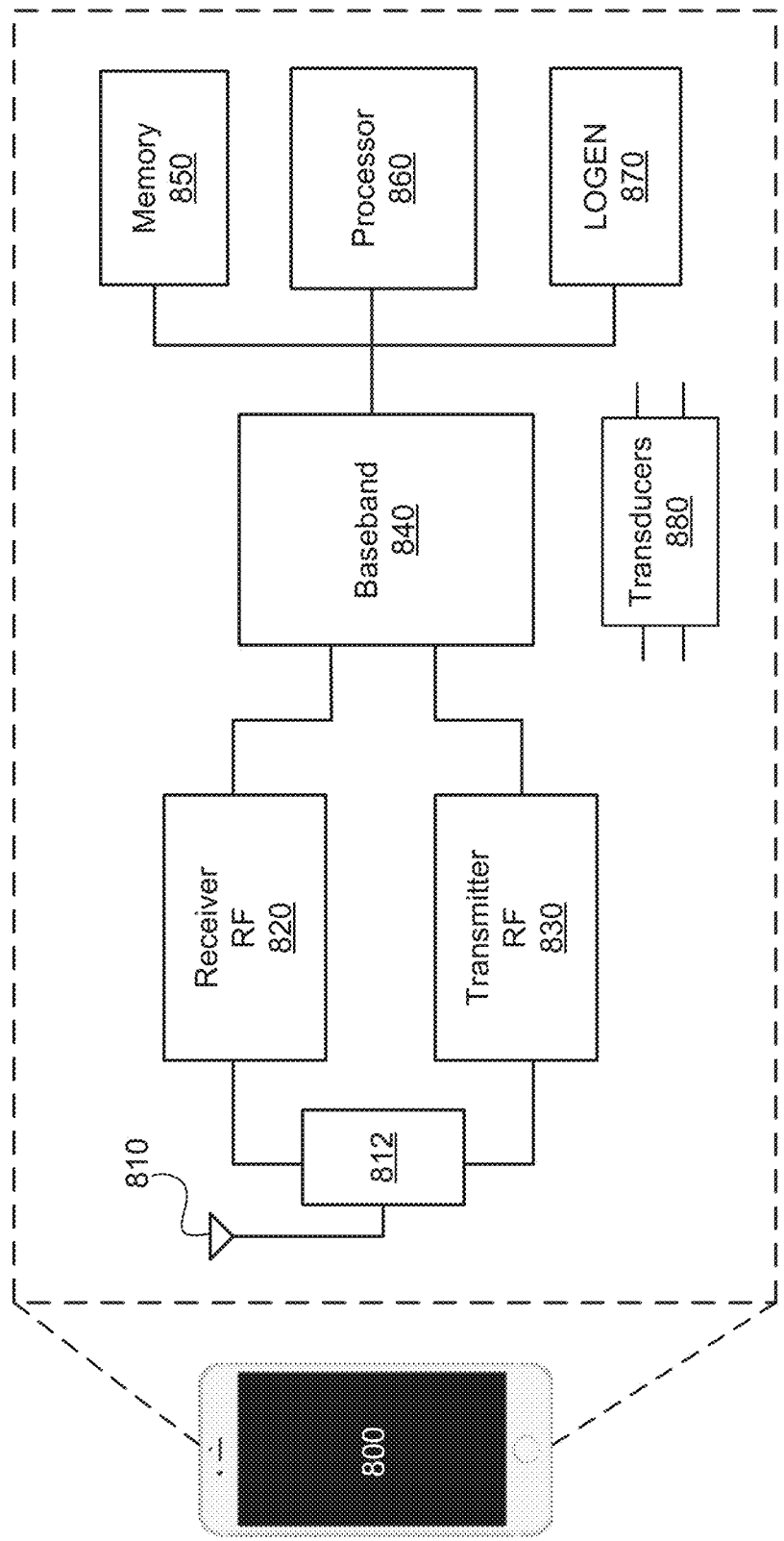
FIG. 8 is a block diagram illustrating an example wireless communication device, within which one or more environmental sensing devices of the subject technology can be integrated.

FIG. 8 is a block diagram illustrating an example wireless communication device, within which one or more environmental sensing devices of the subject technology can be integrated. The wireless communication device 800 may represent a smart phone or a smart watch hosting the capacitive pressure sensor (e.g., 202 of FIG. 2) and the corresponding telescopic front-end circuit (e.g., as described in FIGS. 2 and 4) of the subject technology. The wireless communication device 800 may comprise a radio-frequency (RF) antenna 810, a receiver 820, a transmitter 830, a baseband processing module 840, a memory 850, a processor 860, a local oscillator generator (LOGEN) 870 and one or more transducers 880. In various embodiments of the subject technology, one or more of the blocks represented in FIG. 8 may be integrated on one or more semiconductor substrates. For example, the blocks 820-870 may be realized in a single chip or a single system on a chip, or may be realized in a multi-chip chipset.

The receiver 820 may comprise suitable logic circuitry and/or code that may be operable to receive and process signals from the RF antenna 810. The receiver 820 may, for example, be operable to amplify and/or down-convert received wireless signals. In various embodiments of the subject technology, the receiver 820 may be operable to cancel noise in received signals and may be linear over a wide range of frequencies. In this manner, the receiver 820 may be suitable for receiving signals in accordance with a variety of wireless standards, Wi-Fi, WiMAX, Bluetooth, and various cellular standards. In various embodiments of the subject technology, the receiver 820 may not require any SAW filters and few or no off-chip discrete components such as large capacitors and inductors.

The transmitter 830 may comprise suitable logic circuitry and/or code that may be operable to process and transmit signals from the RF antenna 810. The transmitter 830 may, for example, be operable to up-convert baseband signals to RF signals and amplify RF signals. In various embodiments of the subject technology, the transmitter 830 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 830 may be operable to provide signals for further amplification by one or more power amplifiers.

The duplexer 812 may provide isolation in the transmit band to avoid saturation of the receiver 820 or damaging parts of the receiver 820, and to relax one or more design requirements of the receiver 820. Furthermore, the duplexer 812 may attenuate the noise in the receive band. The duplexer may be operable in multiple frequency bands of various wireless standards.

The baseband processing module 840 may comprise suitable logic, circuitry, interfaces, and/or code that may be operable to perform processing of baseband signals. The baseband processing module 840 may, for example, analyze received signals and generate control and/or feedback signals for configuring various components of the wireless communication device 800, such as the receiver 820. The baseband processing module 840 may be operable to encode, decode, transcode, modulate, demodulate, encrypt, decrypt, scramble, descramble, and/or otherwise process data in accordance with one or more wireless standards.

The processor 860 may comprise suitable logic, circuitry, and/or code that may enable processing data and/or controlling operations of the wireless communication device 800. In this regard, the processor 860 may be enabled to provide control signals to various other portions of the wireless communication device 800. The processor 860 may also control transfers of data between various portions of the wireless communication device 800. Additionally, the processor 860 may enable implementation of an operating system or otherwise execute code to manage operations of the wireless communication device 800.

The memory 850 may comprise suitable logic, circuitry, and/or code that may enable storage of various types of information such as received data, generated data, code, and/or configuration information. The memory 850 may comprise, for example, RAM, ROM, flash, and/or magnetic storage. In various embodiment of the subject technology, information stored in the memory 850 may be utilized for configuring the receiver 820 and/or the baseband processing module 840.

The local oscillator generator (LOGEN) 870 may comprise suitable logic, circuitry, interfaces, and/or code that may be operable to generate one or more oscillating signals of one or more frequencies. The LOGEN 870 may be operable to generate digital and/or analog signals. In this manner, the LOGEN 870 may be operable to generate one or more clock signals and/or sinusoidal signals. Characteristics of the oscillating signals such as the frequency and duty cycle may be determined based on one or more control signals from, for example, the processor 860 and/or the baseband processing module 840.

In operation, the processor 860 may configure the various components of the wireless communication device 800 based on a wireless standard according to which it is desired to receive signals. Wireless signals may be received via the RF antenna 810, amplified, and down-converted by the receiver 820. The baseband processing module 840 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 850, and/or information affecting and/or enabling operation of the wireless communication device 800. The baseband processing module 840 may modulate, encode, and perform other processing on audio, video, and/or control signals to be transmitted by the transmitter 830 in accordance with various wireless standards. In some implementations, the transducers 880 may include a pressure sensor, for example, a capacitive pressure sensor (e.g., 202 of FIG. 2), the signal from which can be processed by the telescopic front-end circuit of the subject technology.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless communication device, the device comprising:
   a pressure sensor configured to generate a first signal in response to a pressure variation;
   a variable offset capacitor, the capacitance value of which is controlled digitally, wherein the variable offset capacitor is coupled in parallel with the pressure sensor; and
   a telescopic front-end circuit configured to divide a dynamic range into two different regions associated with two different analog-to-digital converters (ADCs) with different speeds including a first ADC and a second ADC,
wherein the first ADC comprises a low-power and a low-resolution ADC and is a lower speed ADS of the two different ADCs and is coupled to the variable offset capacitor to convert the first signal to a digital signal, and the second ADC comprises a higher speed ADC of the two different ADCs.

2. The device of claim 1, wherein a power consumption of the first ADC is within a range of about 4-9 µWatt, and a resolution of the first ADC is within a range of about 6-8 bits.

3. The device of claim 1, wherein the second ADC comprises a medium-speed ADC having a speed within a range of about 20-25 Hz.

4. The device of claim 1, wherein the digitally controlled variable capacitor comprises a digital-to-analog converter (DAC) circuit.

5. The device of claim 4, further comprising an adder circuit coupled between an output of the pressure sensor and an input of the first ADC.

6. The device of claim 5, wherein the adder circuit is configured to add an analog output of the DAC circuit to the first signal.

7. The device of claim 4, further comprising a gain stage coupled between the DAC circuit and the second ADC.

8. The device of claim 1, wherein the wireless communication device comprises a smart phone or a smart watch.

9. An apparatus comprising:
a variable offset capacitor, the capacitance value of which is controlled digitally, wherein the variable offset capacitor is coupled in parallel with a pressure sensor;
a buffer circuit coupled to the variable offset capacitor; and
a telescopic front-end circuit configured to divide a dynamic range into two different regions associated with two different analog-to-digital converters (ADCs) with different speeds including a first ADC and a second ADC,
wherein the first ADC comprises a low-power and a low-resolution ADC and is a lower speed ADC of the two different ADCs and is coupled to the variable offset capacitor to convert the first signal to a digital signal, and the second ADC comprises a higher speed ADC of the two different ADCs.

10. The apparatus of claim 9, wherein the first ADC comprises a low-power ADC, wherein a power consumption of the low-power ADC is within a range of about 4-9 µWatt.

11. The apparatus of claim 9, wherein the first ADC comprises a low-resolution ADC, wherein a resolution of the low-resolution ADC is within a range of about 6-8 bits.

12. The apparatus of claim 9, wherein the digitally controlled variable offset capacitor comprises a digital-to-analog converter (DAC) circuit.

13. The apparatus of claim 12, wherein the DAC circuit is configured to receive a digital control signal from a control module.

14. The apparatus of claim 13, wherein the control module is configured to generate the digital control signal based on a digital output signal of the first ADC.

15. An analog front-end circuit for processing a pressure sensor signal, the front-end circuit comprising
an offset capacitor, the capacitance value of which is controlled digitally, wherein the offset capacitor is coupled in parallel with a pressure sensor and configured to lower a dynamic range of the pressure sensor signal, wherein the dynamic range of the pressure sensor signal is divided into two different regions associated with two different analog-to-digital converters (ADCs) with different speeds;
a first analog-to-digital converter (ADC) coupled to the pressure sensor and configured to convert the pressure sensor signal to a first digital signal;
a digital-to-analog converter (DAC) circuit coupled to the first ADC and configured to convert the first digital signal to a first analog signal;
a summation circuit configured to combine the pressure sensor signal and the first analog signal to generate a combined analog signal; and
a second ADC configured to convert the combined analog signal to an output digital circuit, wherein the first ADC comprises a low power and lower-resolution ADC and is a lower speed ADC of the two different ADCs.

16. The front-end circuit of claim 15, wherein the first ADC has a power consumption within a range of about 4-9 µWatt.

17. The front-end circuit of claim 15, wherein a speed of the first ADC is within a range of about 0.5-0.7 Hz and the lower-resolution is within a range of about 6-8 bits.

18. The front-end circuit of claim 17, further comprising a gain stage coupled between the summation circuit and the second ADC.

19. The front-end circuit of claim 18, wherein the gain stage is configured to amplify the combined analog signal.

* * * * *